Patented Apr. 7, 1953

2,633,777

UNITED STATES PATENT OFFICE 2,633,777

INDEXING MECHANISM FOR STATION TYPE MACHINES

Joseph H. Hoern, Saginaw, Mich., assignor to Hoern & Dilts, Inc., Saginaw, Mich.

Application October 22, 1951, Serial No. 252,535

18 Claims. (Cl. 90—56)

The instant invention relates to an indexing mechanism for indexing station type precision boring and turning machines, and more particularly to indexing means for locking the indexible carrier in indexed position, eliminating wear on the coacting surfaces and any undue strain of the shaft bearing and associated parts.

One of the prime objects of the invention is to design a very simple, accurate, and relatively inexpensive indexing mechanism for cooperation with the indexible carrier of a precision boring and turning machine, and more particularly to an indexing mechanism which operates with a minimum of sliding contact between coacting surfaces of the carrier and indexing mechanism, thus eliminating wear on these surfaces and maintaining extreme accuracy throughout the entire life of the mechanism.

Another object is to design an indexing mechanism including an indexing lever, the carrier engaging detent of which is freely shiftable into and out of the notches in the carrier without sliding contact with the side walls thereof, and provide means associated with said indexing lever for forcing the coacting surfaces thereof into tight facial contact with the side wall in the notch in the carrier, to securely lock said carrier in accurate, properly indexed position.

Still a further object is to provide a smooth operating indexing mechanism including a shiftable locking wedge engageable with the indexing lever and the side walls of the notches in the carrier for firmly and accurately locking the carrier in true indexed position.

A further object is to provide an indexing mechanism and a carrier provided with inserts which can be readily adjusted to angularly displace the work on the carrier relatively small distances within close limits, thus adapting the carrier to precision operations requiring tolerance limits of very minute units of measurements.

Still a further object is top provide a work indexing mechanism for a carrier having pressure agent actuating mechanism for controlling the locking means, said actuating mechanism including a pressure cylinder rockably mounted on a support, so that the locking wedge will follow the arc of swinging movement of the indexible lever to allow free and easy movement of the carrier locating and locking means into position.

A further object is to provide simple, practical, and positive wedging means associated with the indexing lever for shifting the contacting surfaces of the indexing lever flatwise into intimate contact with the coacting surfaces on the carrier, and for automatically swinging the free end of the indexing lever out of engagement therewith, eliminating sliding contact of the coacting surfaces with relation to each other and any wear incident thereto, so that the mechanism will wear for long periods of time and the accuracy of the machine will be maintained indefinitely.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

Figure 1:
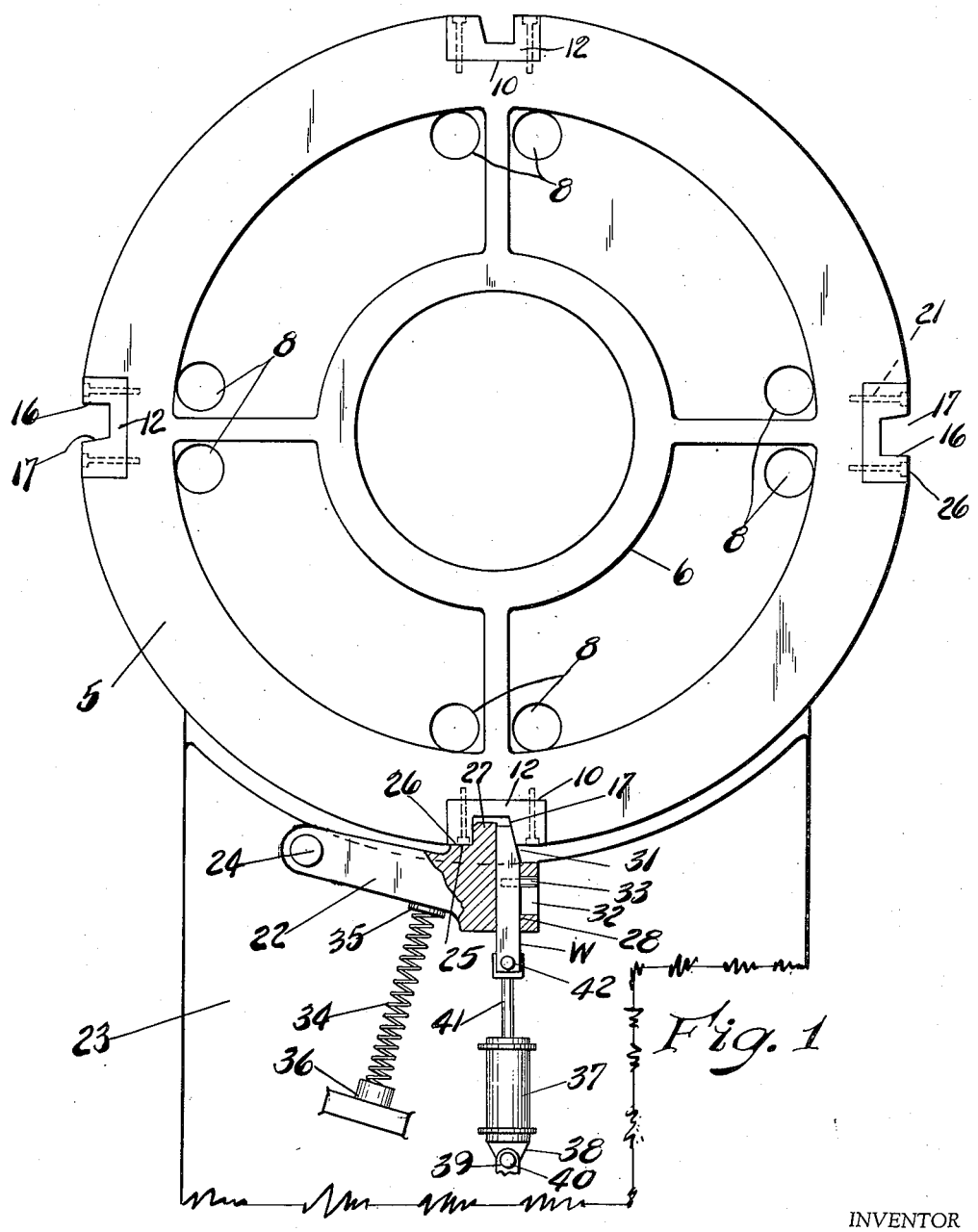
Fig. 1 is a fragmentary, part sectional, top plan view of the carrier and indexing mechanism, showing the indexing lever in its operative position in one of the indexed notches to lock the carrier in a predetermined position of angular adjustment.

Referring now more particularly to the drawings in which there is shown for the purpose of convenience of illustration an indexible carrier or turntable generally designated 5, which forms a part of a precision boring and turning machine (not shown) or which can be substituted for the carrier of any conventional machine tool to convert the same to a precision indexible machine tool if desired.

The carrier 5 can be mounted on a suitable bearing shaft (not shown), and this carrier can be drivingly connected to gearing of the Geneva type (not shown) to accurately rotate the carrier in accordance with the machine tool feed, and inasmuch as the instant invention is directed broadly to an indexing mechanism for carriers and the like, I do not deem it necessary to show the specific boring and turning machine or describe the operation thereof, except to illustrate the indexing mechanism and carrier, and describe the relationship of the various parts.

The carrier 5 is preferably in the form of a casting, and includes a hub portion 6 having a central opening 7 for receiving a supporting shaft (not shown), in the conventional manner, and work stations 8 are formed on the surface of the carrier 5 at equidistantly spaced-apart circumferential locations.

The carrier as shown is designed for a four station indexing type machine, the enlarged rim portion 9 being provided with equidistantly and circumferentially spaced notches 10, said notches being provided with radial walls 11 which extend at an angle to a plane parallel with the carrier axis, and these walls are arranged in parallel relation with one another, and at an acute angle to the axis plane.

Mounted in each of the notches 10 in the peripheral edge of the enlarged rim portion 9 is an insert 12 which is shaped to correspond to and fit the notches 10, said insert being formed with end walls 14 which are parallel with one another and closely fit the inclined walls 11 of the notch 10 so that movement of the inserts 12 in a direction parallel with the axis of the carrier will cause said inserts to be angularly displaced a very small fraction of a degree.

Each of the inserts 12 is provided with a central notch 15 having a radial wall 16 and an inclined wall 17, said wall 17 forming a wedge surface 18 adapted to be engaged by a locking wedge W which will be hereinafter more fully described.

On opposite sides of the notch 15 of each insert 12 there is formed a pair of parallel slots 19 which extend in a direction parallel with the inclined walls 11 of the inserts to permit sliding adjustment in the carrier, these slots 19 being cut away as shown to accommodate the heads 20 of screws 21, and are of a length to permit the inserts 12 to be adjusted vertically in either direction a distance limited only by the length of said slots.

Figure 2:
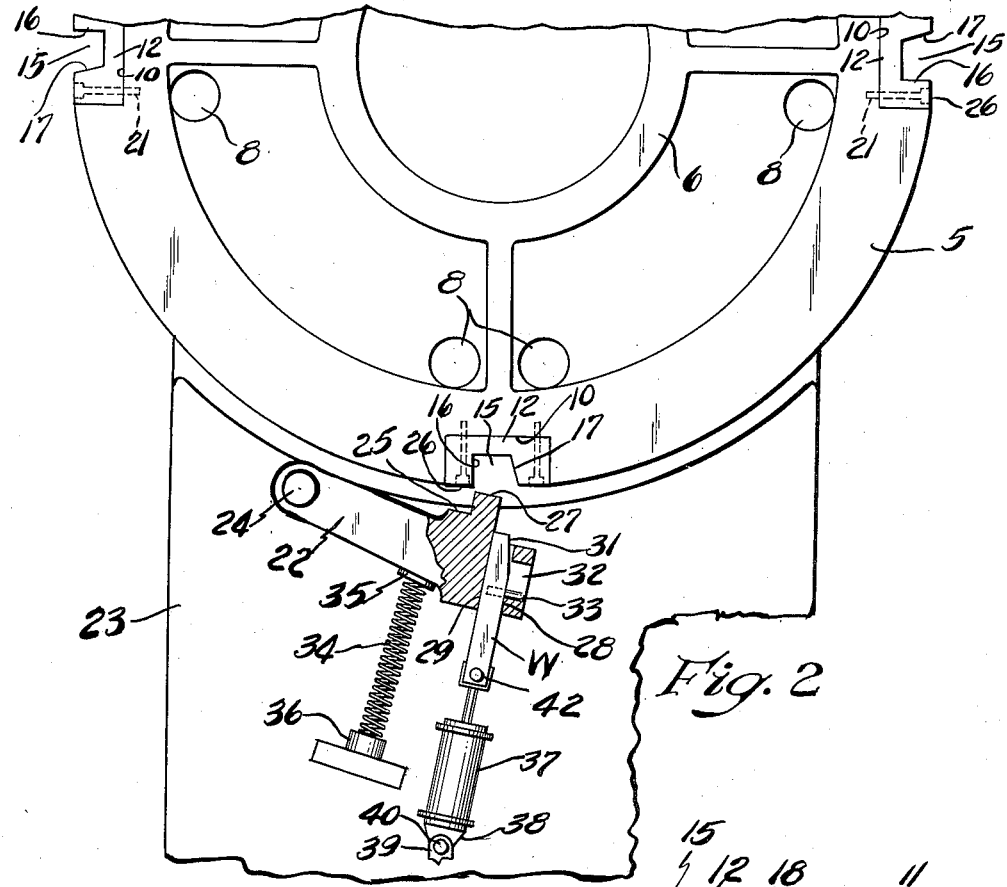
Fig. 2 is a fragmentary, part sectional, top plan view similar to Fig. 1 showing the indexing lever in its inoperative position with the locking wedge retracted.
Figure 3:
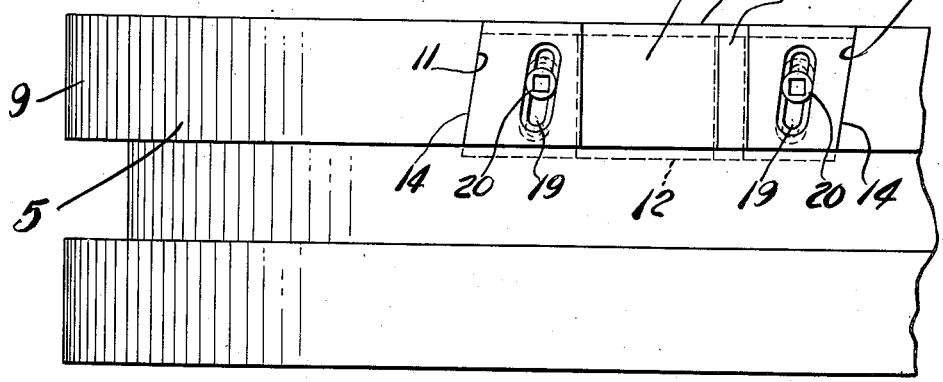
Fig. 3 is an enlarged, fragmentary, edge-elevational view showing the adjustable and replaceable inserts and the manner in which the same is held in predetermined positions of angular adjustment, the broken lines illustrating the adjustment of the inserts.

The carrier is held in indexed position by means of an indexing lever 22 which is pivotally mounted on a suitable support 23 (see Fig. 2), by means of a pin 24, and said support 23 is preferably formed as part of the machine frame structure on which the carrier 5 is mounted, the one edge of the free swinging end of the indexing lever being shouldered as clearly shown in Fig. 2 to form a contact surface 25 for engagement with the outer face 26 of the insert 12, said shoulder terminating in a detent projection 27 adapted to be freely received in the notches 15 of said inserts, contact of the surface 25 with surface 26 limiting inward travel of the lever and detent.

A transversely disposed passage 28 is provided in the outer end of the indexing lever 22, the end wall 29 of said lever being co-extensive with the detent 27 and forms a sliding guideway for the reciprocating locking wedge W, the one side wall 30 of said locking wedge being provided with a beveled end section 31 which corresponds to the inclined surface 17 of the insert 12.

The locking wedge W is reciprocatingly mounted in the passage 28, so that when actuated, the beveled end section 31 will slide in parallel relation with the lever detent 27, engagement of the beveled section 31 with the surface 18 moving the detent flatwise into engagement with the wall 16.

A longitudinally disposed slot 32 is provided in the end wall of the passage 28, and a pin 33 is carried by the locking wedge W, said pin projecting through the slot 32 such that when said locking wedge is being withdrawn from the notch 15, the pin 33 will, on its outward stroke, engage the one end of said slot and swing the locking lever about the pin 24 and out of engagement with the carrier 5, all as clearly shown in Fig. 2 of the drawings.

A coil spring 34 has one of its ends engaging a support 35 provided on one edge of the indexing lever 22, the opposite end of said spring yieldingly urging the free end of the index lever towards the carrier at all times.

The reciprocating locking wedge W is actuated by a pressure control system including a cylinder 37 having means (not shown) for admitting a pressure agent to either end thereof, and said cylinder is provided at one end with an ear 38 which is rockably mounted between a pair of supporting lugs 39 by means of a pivot pin 40.

The cylinder 37 is also provided with a reciprocating piston (not shown) having a piston rod 41 which is pivotally connected to the outer end of the locking wedge W as at 42, thus, when a pressure agent is admitted to the one end of the cylinder 37, the locking wedge W will be forced into engagement with the angled side wall 17 of the inserts, forcing the detent 27 flatwise against the face of the wall 16, all as shown in Fig. 1 of the drawings.

While in the instant application I have shown a specific means for actuating the indexing lever and locking wedge, it will, of course, be understood that this can be accomplished in various ways.

To eliminate wear and assure unobstructed entry of the detent 27 into the notch 15, I slightly over-index the carrier 5; that is, the carrier is not indexed exactly 90 degrees (in a four spindle machine), but is slightly over-indexed upon each indexing movement, so that initially there is no sliding engagement of the detent with the wall 16 of the insert, contact occurring only when the locking wedge W moves inwardly as previously described.

In use and operation, the insert 12 is first adjusted to properly align the work (not shown) on the carrier, and after the first operation is completed, and with the mechanism in position shown in Fig. 2 of the drawings, a pressure agent is admitted to the cylinder 37, causing the locking wedge to move inwardly and the pin 33 to move away from the end of the slot 32, allowing the spring 34 to urge the indexing lever toward the carrier, and the detent 27 into the notch 15 until the contact surface 25 of the indexing lever engages the surface 26 of the insert, after which the wedge 31 and surface 18 mutually engage to force the detent flatwise against walls 16 and securely lock the carrier in its adjusted position.

After the machining operation at the one station has been completed, the pressure agent is admitted to the opposite end of the cylinder 37, retracting the locking wedge W, and during the initial retracting movement, the wedge section 31 slides free of the surface 17, and when the pin 33 engages the end of the slot 32, the lever 22 will be swung in a direction away from the carrier to disengage the detent 27 from the insert notch 15. The carrier 5 is then rotated and the next notch brought into register with the detent 27, after which the pressure agent is then admitted to the opposite end of the cylinder and the detent again moves into the notch as previously described.

It will be noted that the initial movement of the locking wedge W, in a direction away from the carrier 5, causes the wedge surface 31 to separate from the wedge surface 18 of the insert notch 15; thus, sticking of these surfaces will be prevented and the separation will be smooth and easy. Also, any sticking of the detent in the notch 15 will be overcome when the pin 33 reaches the end of the slot 32 and exerts an outward pull on the indexing lever 22.

After the work has been once set up and the various adjustments made, workpieces of all kinds can be mass-produced with precision and rapidity.

From the foregoing description, it will be obvious that I have perfected a very simple, practical and improved indexing mechanism for indexing indexible carriers and the like.

What I claim is:

1. In an indexing mechanism for precision machine tools, a carrier having circumferentially spaced-apart detent-receiving notches formed in the periphery thereof, a detent movable toward and away from said carrier and adapted to be received in one of said notches, said notches being of substantially greater width than said detent and formed with an inclined side wall and a locking wedge having a correspondingly inclined side wall adapted to be projected into said notch adjacent said detent for forcing said detent flatwise into engagement with the opposite side wall of said notch to lock said carrier in indexed position.

2. In an indexing mechanism for precision machine tools, a revolving carrier having equidistantly and circumferentially spaced-apart notches in the peripheral wall of said carrier, an indexible lever pivotally mounted on a stationary portion of the machine tool adjacent the periphery of said carrier and swingable horizontally toward and away from said carrier, a detent integrally formed on the end of said lever and adapted to be received in one of said notches, stop means on said lever adjacent said detent to engage the peripheral wall of said carrier adjacent said notches for limiting inward travel of said detent into said notch, and locking means for wedging said detent firmly in position in said notch.

3. In an indexing mechanism for precision machine tools, a revolving carrier having equidistantly and circumferentially spaced-apart radial notches in the periphery thereof, an indexible lever pivotally mounted on a stationary portion of the machine tool adjacent the periphery of said carrier and swingable horizontally toward and away from said carrier, adjustable inserts mounted in said notches having recess openings therein, and a detent integrally formed on the end of said lever adapted to be received in one of said recess openings, a shoulder being formed on the lever adjacent said detent to engage the peripheral wall of said carrier adjacent said notches to limit inward travel of said detent.

4. In an indexing mechanism for machine tools, a carrier having equidistantly and circumferentially spaced-apart notches in the peripheral edge thereof, obliquely adjustable inserts mounted in said notches having detent-receiving recesses, and a detent movable toward and away from said turntable adapted to be received in the detent recesses of said inserts, said recess openings being provided with an inclined surface corresponding to an inclined surface on said detent.

5. In an indexing mechanism for machine tools, a carrier having equidistantly and circumferentially spaced-apart notches in the peripheral edge thereof, obliquely adjustable inserts mounted in said notches having detent-receiving recesses formed therein, and a detent movable angularly toward and away from said carrier adapted to be received in the detent recesses in said inserts, said notches being arranged to extend transversely of the periphery of said carrier at an oblique angle so that an adjustment of said inserts adjusts the angular position of said inserts.

6. In an indexing mechanism for machine tools, a carrier having a plurality of radially extending vertically inclined notches in the peripheral wall thereof arranged in circumferentially and equidistantly spaced-apart relation, obliquely adjustable inserts for each of said notches so that said inserts may be adjusted angularly with relation to said carrier, said notches having detent receiving recesses, fastener elements for removably and adjustably holding said inserts in said notches, and a detent movable toward and away from said carrier adapted to be received in said detent recesses for locking said carrier in a predetermined angular position of adjustment.

7. In an indexing mechanism for machine tools, a carrier having a plurality of radially disposed notches in the peripheral edge thereof arranged in circumferentially and equidistantly spaced-apart relation, said notches having inclined parallel side walls, inserts for said notches having detent receiving recesses, fastener elements extending through slotted openings in said inserts to hold the same in an adjusted position, said inserts being provided with inclined end walls corresponding to the inclined walls of the notches to permit the inserts to be adjusted upwardly and downwardly and position said detent receiving recesses at various positions of angular adjustment, and a detent movable toward and away from said carrier adapted to be received in said detent receiving recesses.

8. In an indexing mechanism for machine tools, a carrier having circumferentially and equidistantly spaced-apart radial notches in the peripheral edge thereof, said notches having inclined parallel side walls adjustable and replaceable inserts mounted in said notches having correspondingly inclined side walls to permit the angular adjustment of said inserts, said inserts having detent receiving recesses, a detent movable toward and away from said carrier adapted to be received in the recess of one of said inserts at a time, a locking wedge carried by said detent adapted to be projected into said detent receiving recesses, and power actuating means for controlling said locking wedge.

9. In an indexing mechanism for machine tools, a carrier having a series of circumferentially and equidistantly spaced-apart radially extending notches having oblique parallel side walls in the peripheral edge thereof, adjustable inserts having correspondingly oblique parallel side walls mounted in said notches to permit a limited angular adjustment of said inserts, said notches having detent receiving recesses, a detent movable toward and away from said carrier adapted to be received in said recesses, a sliding wedge block carried by said detent having a wedge surface adapted to coact with a wedge surface in said recess to provide mutually engaging locking surfaces, and power operated actuating means for controlling said wedge block.

10. In an indexing mechanism for machine tools, a carrier having a plurality of equidistantly spaced-apart detent receiving notches in the peripheral edge thereof, a detent movable toward and away from said carrier adapted to engage within said notches to hold the same in a fixed position, a sliding wedge member carried by the detent and movable relative thereto, said notches and sliding wedge being provided with oblique surfaces to provide mutually engaging contact locking surfaces, a pressure fluid cylinder having a piston operatively connected to said sliding wedge block, and a pin and slot connection between said wedge block and detent to permit said wedge block to withdraw said detent when the wedge block is moved in a direction away from said cylinder.

11. In an indexing mechanism for machine tools, a carrier having detent-receiving notches equidistantly and circumferentially spaced-apart in the peripheral edge thereof, a detent movable toward and away from said carrier adapted to be received in one of the notches to position the carrier in a predetermined relation, a sliding block carried by said detent, said sliding block and notches being provided with angular walls to form mutually engaging contact locking surfaces, a pressure actuated means connected to said sliding block to project and retract the same with respect to said recesses, and means connecting said sliding block and detent whereby movement of said sliding block in a direction away from said carrier will retract said detent.

12. In an indexing mechanism for machine tools, a carrier having detent-receiving recesses in the peripheral edge thereof, a detent yieldingly urged toward said carrier, a sliding block carried by said detent, said recesses and sliding block being provided with mutually engaging wedge locking surfaces, means for projecting said sliding block into said recesses and means interconnecting said block and detent to retract said detent when the sliding block is retracted.

13. In an indexing mechanism for machine tools, a carrier having a plurality of equidistantly spaced-apart notches in the peripheral edge thereof, obliquely adjustable inserts having detent receiving recesses for each of said notches to permit angular adjustment of said inserts with relation to said carrier, a detent movable toward and away from said carrier adapted to engage within said recesses to hold the same in a fixed position, a sliding wedge member carried by the detent and movable relative thereto, said recesses and sliding wedge being provided with oblique surfaces to provide mutually engaging contact locking surfaces, a pressure fluid cylinder having a piston operatively connected to said sliding wedge block, and a pin and slot connection between said wedge block and detent to permit said wedge block to withdraw said detent when the wedge block is moved in a direction away from said cylinder.

14. In an indexing mechanism for machine tools, a carrier having notches equidistantly and circumferentially spaced-apart in the peripheral edge thereof, obliquely adjustable inserts having detent receiving recesses for each of said notches to permit angular adjustment of said inserts with relation to said carrier, a detent movable toward and away from said carrier adapted to be received in one of the recesses to position the carrier in a predetermined relation, a sliding block carried by said detent, said sliding block and recesses being provided with angular walls to form mutually engaging contact locking surfaces, a pressure-actuated means connected to said sliding block to project and retract the same with respect to said recesses, and means connecting said sliding block and detent whereby movement of said sliding block in a direction away from said carrier will retract said detent.

15. In an indexing mechanism for machine tools, a carrier having notches in the peripheral edge thereof, obliquely adjustable inserts having detent receiving recesses for each of said notches to permit angular adjustment of said inserts with relation to said carrier, a detent yieldingly urged toward said carrier, a sliding block carried by said detent, said insert recesses and sliding block being provided with mutually engaging wedge locking surfaces, means for projecting said sliding block into said insert recesses, and means interconnecting said block and detent to retract said detent when the sliding block is retracted.

16. In an indexing mechanism for machine tools, a carrier having a plurality of equidistantly spaced-apart notches in the peripheral edge thereof, said notches having vertically inclined parallel side walls, obliquely adjustable inserts with correspondingly vertically inclined, parallel side walls for each of said notches to permit angular adjustment of said inserts with relation to said carrier, said inserts having detent-receiving recesses, a detent movable toward and away from said carrier adapted to engage within said recesses to hold the same in a fixed position, a sliding wedge member carried by the detent and movable relative thereto, said recesses and sliding wedge being provided with oblique surfaces to provide mutually engaging contact locking surfaces, a pressure fluid cylinder having a piston operatively connected to said sliding wedge block, and a pin and slot connection between said wedge block and detent to permit said wedge block to withdraw said detent when the wedge block is moved in a direction away from said cylinder.

17. In an indexing mechanism for machine tools, a carrier having notches equidistantly and circumferentially spaced-apart in the peripheral edge thereof, said notches having vertically inclined parallel side walls, obliquely adjustable inserts with correspondingly vertically inclined parallel side walls for each of said notches to permit angular adjustment of said inserts with relation to said carrier, said inserts having detent receiving recesses, a detent movable toward and away from said carrier adapted to be received in one of the recesses to position the carrier in a predetermined relation, a sliding block carried by said detent, said sliding block and recesses being provided with angular walls to form mutually engaging contact locking surfaces, a pressure-actuated means connected to said sliding block to project and retract the same with respect to said recesses, and means connecting said sliding block and detent whereby movement of said sliding block in a direction away from said carrier will retract said detent.

18. In an indexing mechanism for machine tools, a carrier having notches in the peripheral edge thereof, said notches having vertically inclined parallel side walls, obliquely adjustable inserts with correspondingly vertically inclined parallel side walls for each of said notches to permit angular adjustment of said inserts with relation to said carrier, said inserts having detent-receiving recesses, a detent yieldingly urged toward said carrier, a sliding block carried by said detent, said insert recesses and sliding block being provided with mutually engaging wedge locking surfaces, means for projecting said sliding block into said insert recesses, and means interconnecting said block and detent to retract said detent when the sliding block is retracted.

JOSEPH H. HOERN.

REFERENCES CITED

The following references are of record in the file of this patent:

UNITED STATES PATENTS

| Number | Name | Date |
|---|---|---|
| 517,168 | Richards | Mar. 27, 1894 |
| 874,175 | Falk | Dec. 17, 1907 |
| 966,564 | Koegler | Aug. 9, 1910 |
| 2,295,247 | Wessman | Sept. 8, 1942 |
| 2,544,652 | Borchardt | Mar. 13, 1951 |